United States Patent [19]

Earle

[11] 3,740,799

[45] June 26, 1973

[54] SAFETY SPLICE FOR HANDRAIL BREAK

[76] Inventor: Henry Leonard Earle, 18 Colgate Road, Maplewood, N.J. 07040

[22] Filed: Aug. 3, 1972

[21] Appl. No.: 277,808

[52] U.S. Cl. .................. 24/33 B, 74/231 J, 198/16
[51] Int. Cl. ........................... B66b 9/14, F16g 3/00
[58] Field of Search......................... 198/16, 17, 18; 74/231 J, 231 P; 24/31 R, 31 B, 31 V, 31 W, 31 H, 33 V, 33 B, 33 P, 33 R, 33 A

[56] References Cited
UNITED STATES PATENTS

| | | | |
|---|---|---|---|
| 1,506,489 | 8/1924 | Kiefer | 24/33 B |
| 2,362,949 | 11/1944 | Tingley et al. | 24/33 B |
| 2,956,662 | 10/1960 | Hansen | 198/16 |
| 3,461,511 | 8/1969 | Perina | 24/31 V |
| 3,693,218 | 9/1972 | Jaubert | 74/231 J |

Primary Examiner—Donald A. Griffin
Attorney—William S. Hill

[57] ABSTRACT

A safety splice for joining the ends of a break in a handrail of an escalator or moving sidewalk where the handrail is a normally endless belt having an outer covering made of molded rubber, comprising flexible means attached to the severed ends and drawing them together but leaving a space therebetween, a sheet of tough plastic material, shaped to the contour of the molded rubber covering and disposed so as to cover the space between the ends being joined and overlapping them. The plastic material is cemented and stapled to the rubber covering. An outer covering member of relatively thin, flexible plastic material covers the first plastic sheet and is stitched thereto at the edge adjacent the direction of travel of the handrail and is cemented to the first plastic sheet.

6 Claims, 7 Drawing Figures

SAFETY SPLICE FOR HANDRAIL BREAK

BACKGROUND OF THE INVENTION

Escalators and moving sidewalks have balustrades which include handrails comprising endless belts. These handrails are usually made of a plurality of plies of a tough fabric and an outer covering of rubber vulcanized to the fabric plies. The fabric plies and the rubber are molded into a C-shape, the inner surface of the C riding on a track except at the ends of the escalator or sidewalk where it runs over newell wheels which reverse its direction of travel. The handrail runs for many hours at a time and is subject to hard wear. Finally, the rubber weakens and splits and the break must be repaired. One of the usual ways that a break in the endless handrail is repaired is by vulcanizing the rubber. This is an expensive repair and must usually await the arrival of an expert. However, department stores and other places having heavy public patronage cannot afford to have the escalator out of service for a lengthy period. Hence, there has been a demand for a faster repair method that would still be strong and safe.

One way that has been tried in making the escalator handrail repair is to cut entirely through the break (which may be only a deep crack or other incomplete break), and then join the severed ends with a hinge so the leaves of the hinge are attached to the severed ends. The hinge does not interfere with the flexibility of the handrail.

However, a hinge, alone, does not make a satisfactory repair job because there will always be a space between the joined ends which is potentially dangerous to the user. The space is wide enough to accommodate the end of a child's finger and if a finger is inserted in the break as the handrail comes over the bottom newell wheel, it can be badly and painfully pinched as the handrail moves to its normal gripping position. For this reason, a way has been sought to remove the dangers inherent in this type of splice. Because of the frequent flexing and bending to which the handrail is subjected, a simple covering cemented over the break is not satisfactory. This type of repair soon loosens and comes off entirely and because it may come off due to the manipulations of an immature user, the threat of injury to the user is still greater.

DESCRIPTION OF PREFERRED EMBODIMENT

Figure 1:
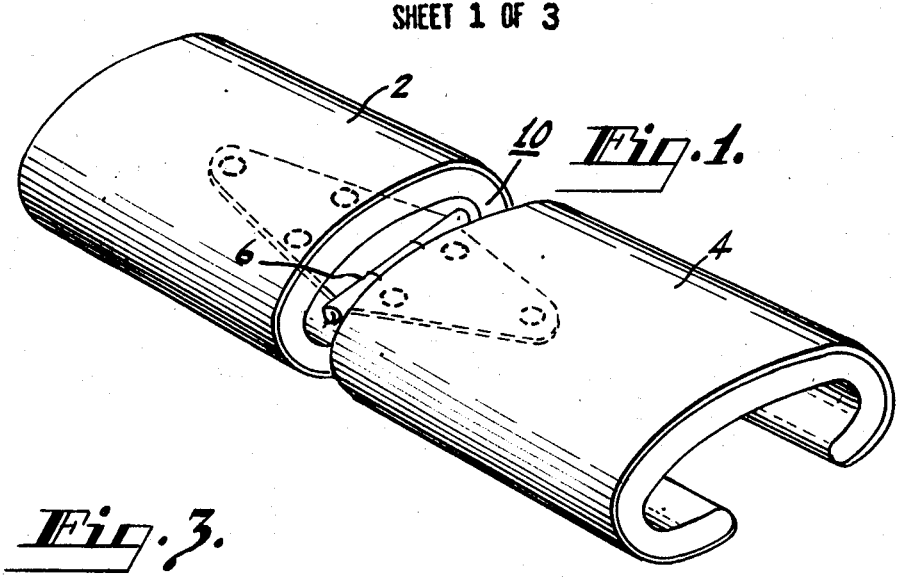
FIG. 1 is a perspective view of a section of a molded rubber handrail of an escalator which has been cut through in order to effect a repair in accordance with the present invention.

The present invention is an improved splice in an escalator handrail which has had severed pieces joined with a hinge or other equivalent flexible means. Referring to FIG. 1, pieces 2 and 4 are portions of a typical escalator handrail made of rubber vulcanized to plies of tough cloth. The handrail is molded into a C-shape and rides on a metal track (not shown) around which it fits somewhat loosely.

Figure 3:
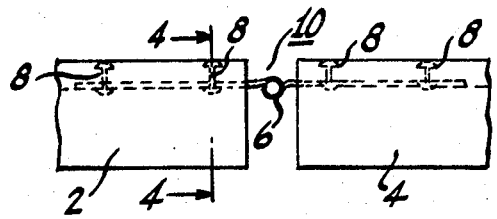
FIG. 3 is an elevation view of the article of FIG. 2 with some parts in phantom.
Figure 2:
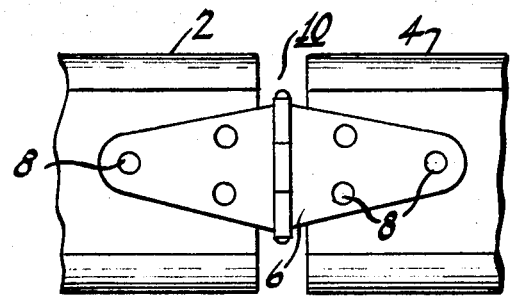
FIG. 2 is a plan view from beneath the handrail section of FIG. 1 showing a hinge riveted to the ends being joined.
Figure 4:
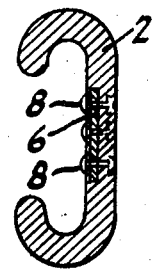
FIG. 4 is a section taken through the line 4—4 of FIG. 3.

Pieces 2 and 4 are joined by means of a strap hinge 6 (FIGS. 2, 3 and 4) the leaves of which are secured to pieces 2 and 4 with countersunk rivets 8. However, this method of joining, although it provides the needed flexibility of the joint, leaves a space 10 which is a potential hazard to users of the escalator. Not only can a user inadvertently get a finger in this space and have the finger pinched painfully as the space moves over a newell wheel, children deliberately place fingers and hands therein without realizing the danger.

Figure 5:
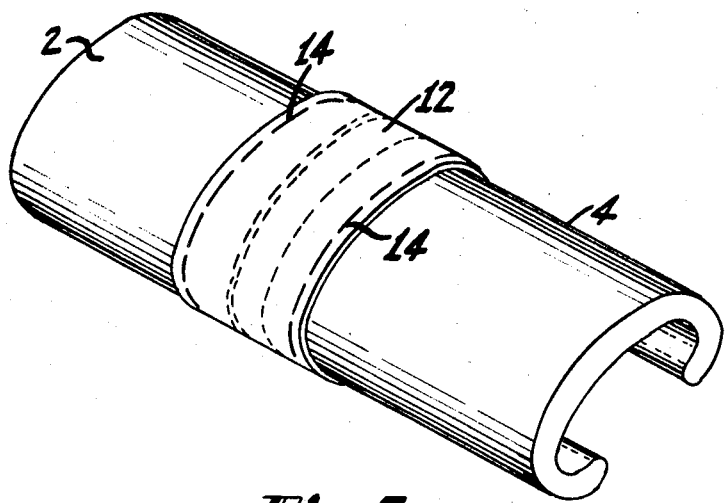
FIG. 5 is a perspective view like that of FIG. 1 showing the splice of the present invention at an intermediate stage of completion.

It is necessary to cover the space 10 in some way but this is a problem because of the constant stretching and flexing to which the joint is subjected. In the present invention the problem is met by first taking a sleeve 12 of Nylon about 20 mils thick, molded into a C-shape like the handrail and cementing it to the rubber handrail pieces 2 and 4 (FIG. 5). The sleeve 12 covers the space 10 between the pieces. However, a cement joint does not stand up to the bending and stretching to which the joint is subjected unless it is reinforced in some manner. It has been found that it is necessary to staple the Nylon sleeve 12 to the pieces 2 and 4 with a line of staples 14. The staples are placed adjacent the edge of the sleeve 12. The staples are not affected by the bending and stretching stresses to which the handrail is subjected and, together with the cement, make a durable joint.

In order to further assure the safety of the user, however, a thin sheet of polyvinyl plastic 16 (FIG. 6), for example, 10 mils thick, is first attached to the molded sleeve 12 by means of a line of stitching 18 adjacent the edge 20 of the sheet 16 which faces the direction of travel of the handrail. Cement is then applied to the under surface of the sheet 16 and it is cemented down to the molded sleeve 12. The size of the vinyl sheet 16 is such that it has a larger area than the sleeve 12 and therefore overlaps on the handrail pieces 2 and 4. The stitching is to prevent the cover sheet from being deliberately worked loose by prying fingers and the overlap affords protection against the somewhat sharp edges of the molded sleeve 12. The cover sheet 16 is also cemented down to the molded rubber pieces 2 and 4 where it overlaps them.

Although Nylon has been given as an example of suitable material to use for the molded sleeve 12, other moldable plastics such as polyethylene and polyurethanes can also be used. It is also possible to use a more pliant plastic which can be hand-shaped to fit the contour of the handrail instead of being molded.

Figure 6:
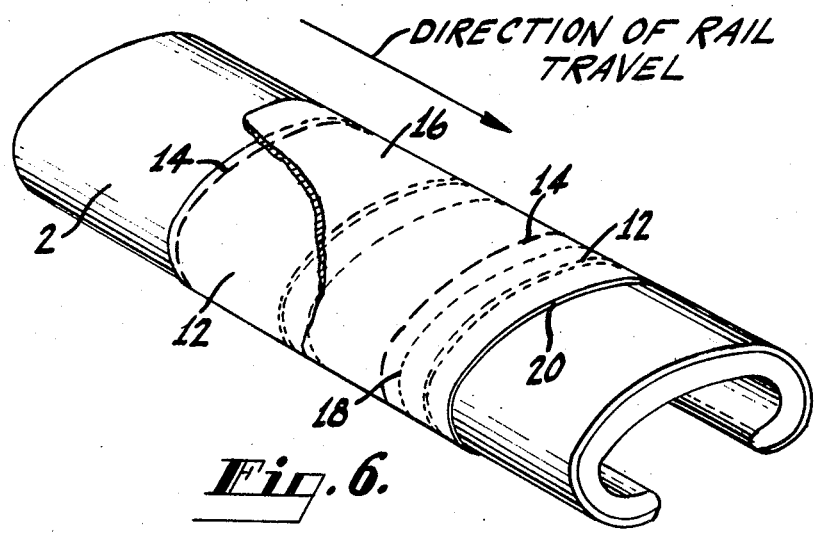
FIG. 6 is a perspective view like that of FIGS. 1 and 5 showing the completed splice.
Figure 7:
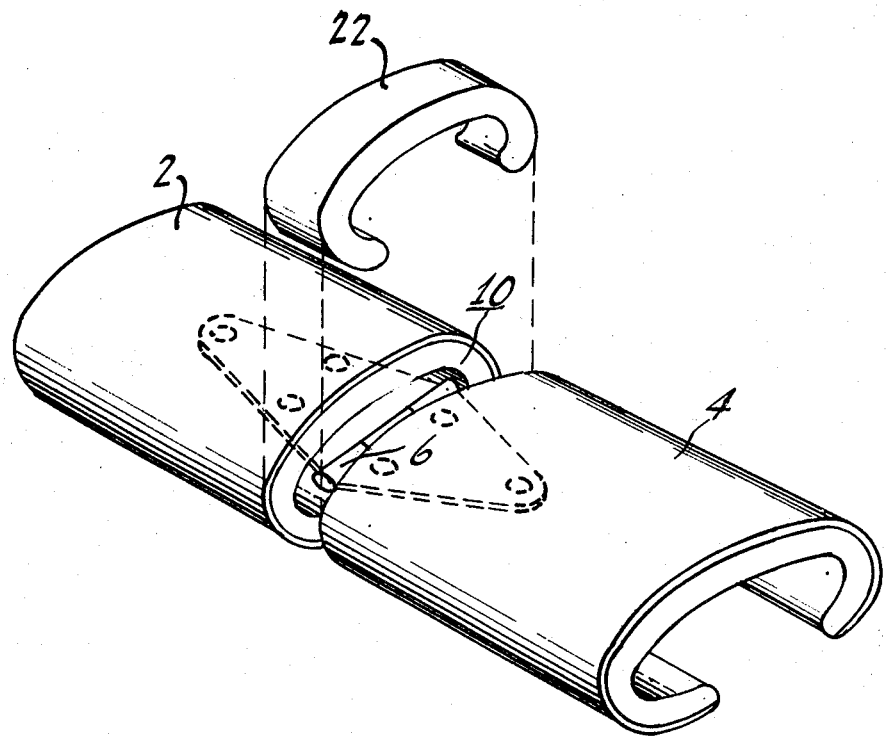
FIG. 7 is a perspective and partly exploded view of a modified form of the invention.

A modification of the invention is illustrated in FIG. 7. Although the space between the sections 2 and 4 of the spliced handrail are covered as illustrated in FIGS. 5 and 6, when the splice moves around the curved portions of track at either end of the run, a hollow forms between the spliced ends. Since it is preferable to eliminate the hollow, a filler section 22 may be inserted in the opening. This section has a C-shape in cross section like that of the spliced portions 2 and 4.

The filler section 22 is made of a flexible material with good recovery characteristics. Examples of suitable materials are resilient and deformable foam plastics and foam rubbers. The section 22 is cemented to the ends of sections 2 and 4 as well as to the hinge 6 and to the underside of the sleeve member 12 when that member is applied.

I claim:

1. A safety splice for joining the severed ends of a handrail of an escalator or moving sidewalk, said handrail comprising a normally endless belt, C-shaped in cross section, made of a plurality of plies of fabric and a thick outer covering of rubber, said splice comprising:

flexible means attached to the under surface of the severed parts so that said severed ends are held in position close to each other but leaving a gap therebetween, a sleeve of tough, pliant, plastic material, shaped so as to have the same C-shaped cross section as said handrail, positioned so as to cover said gap and overlap said severed ends, said sleeve being stapled and cemented to said rubber outer covering, a covering sheet of relatively thin, flexible, plastic material completely covering said sleeve with substantial overlap on said severed ends, said sheet being stitched to said sleeve adjacent the edge thereof which faces in the direction of travel of the handrail, and said sheet also being cemented to said sleeve and to said rubber covering where it overlaps said rubber covering.

2. A splice according to claim 1 in which said sleeve is made of Nylon about 20 mils thick and said sheet is made of a vinyl plastic about 10 mils thick.

3. A splice according to claim 1 in which said sleeve is made of moldable Nylon.

4. A splice according to claim 3 in which said flexible means is a strap hinge.

5. A splice according to claim 1 in which said flexible means is a strap hinge.

6. A splice according to claim 1 including a thin section having a cross section similar to that of said severed ends disposed between and adhered to said ends, said thin section being made of a resilient, deformable plastic or rubber material.

* * * * *